S. V. SHAROOD.
STEAM TRAP VALVE.
APPLICATION FILED MAR. 28, 1911.
1,066,057.
Patented July 1, 1913.
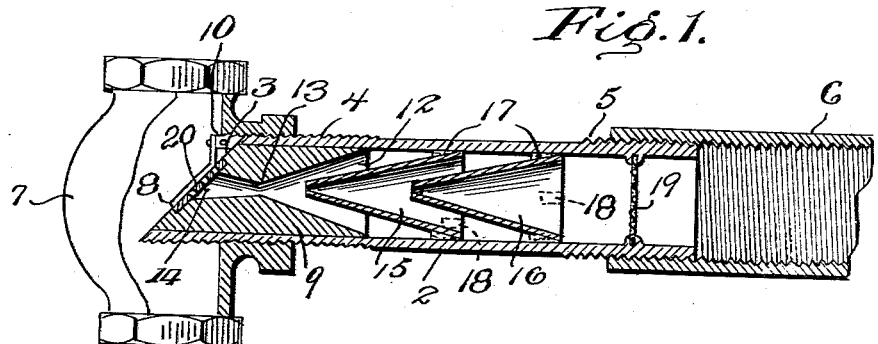
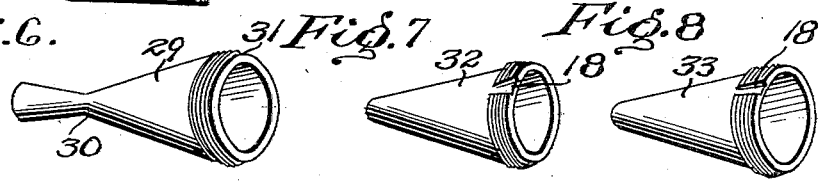
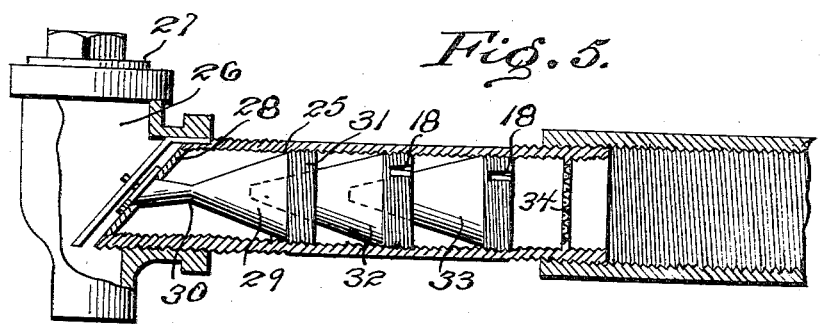
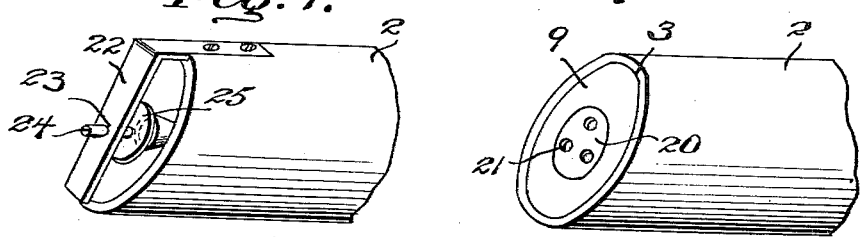
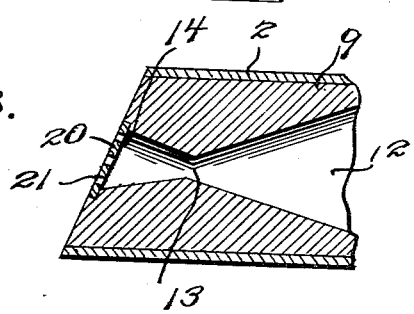
S. V. Sharood, Inventor

UNITED STATES PATENT OFFICE.

SAMUEL V. SHAROOD, OF BROCKTON, MASSACHUSETTS, ASSIGNOR OF ONE-THIRD TO GEORGE V. SCOTT, OF BROCKTON, MASSACHUSETTS.

STEAM-TRAP VALVE.

1,066,057.  Specification of Letters Patent.  Patented July 1, 1913.

Application filed March 28, 1911. Serial No. 617,451.

*To all whom it may concern:*

Be it known that I, SAMUEL V. SHAROOD, citizen of the United States, residing at Brockton, in the county of Plymouth and State of Massachusetts, have invented certain new and useful Improvements in Steam-Trap Valves, of which the following is a specification.

My invention relates to valves and particularly to a valve adapted to act as a check valve in situations where it is desired to prevent the escape of vapor or a fluid such as steam, but permit the escape or passage of liquid such as water of condensation.

My invention is therefore particularly adapted for use as a steam trap.

The principle upon which my invention is based is entirely unknown to me but I have found by practical experience that the device will operate as stated in the following specification, and this even though the outlet end of the valve is disposed in a vacuum.

The primary object of this invention, as above stated, is to provide a steam trap of this character of a very simple construction, preventing the escape of steam but permitting the escape of water of condensation.

Another object is to provide means in connection with a valve of this character whereby the water passing through the valve casing shall be caused to attain a high velocity creating a vacuum in the pipe to which the valve it attached and thus relieving the pipe of condensed water in a very short time.

Another object is the provision of a valve of this character in which the body of the valve is in the form of a section of pipe, one end of which is adapted to be inserted into a pipe coupling T or elbow of common construction, thus permitting the valve body to be separately made and to be applied wherever desired, in a line of pipe without the necessity of using expensive fittings for that purpose.

A further object is the provision of means whereby the valve may be used in high pressure steam pipes.

For a full understanding of the invention reference is to be had to the following description and accompanying drawing, in which:—

Figure 1 is a longitudinal section of one of my improved valves. Fig. 2 is an end view of the body thereof with a reducing disk in place. Fig. 3 is a longitudinal sectional view of the modification shown in Fig. 2. Fig. 4 is a side elevation of another form of valve. Fig. 5 is a longitudinal section of a modified form of the valve body showing a modified form of the integral cones. Figs. 6, 7 and 8 are perspective views of the cones illustrated in Fig. 5 separated from the body of the valve.

Corresponding and like parts are referred to in the following description and indicated in all the views of the accompanying drawing by the same reference characters.

Referring to Figs. 1 to 3 it will be seen that in this embodiment of my invention I provide a tubular valve body 2, consisting of a section of pipe of uniform diameter, one end of the pipe section being cut off at an inclination to the axis of the pipe, as at 3.
The opposite ends of the pipe are screw-threaded as at 4 and 5.

The screw-threads 5 are adapted to be connected to a line of pipe designated 6, while the screw-threads 4 permit the pipe section 2 to be inserted into a pipe connection 7 which may be of any suitable form. In Fig. 1 this connection is shown as a T closed at one end by a cap, the passage opposite the cap being adapted to be connected in a line of pipe. I do not wish to be limited to any particular form for the member 7, as this member might be in the form of a straight pipe coupling if desired, provided it was large enough to permit the valve 8 to move off of its seat.

As illustrated in Fig. 1 the end of the casing 2 is closed by a plug 9. This plug, it will be understood might be formed integral with the pipe section 2, which forms the body of the valve, or it may be screw-threaded and afterward inserted into the end of the pipe section. This member 9 has an inclined face corresponding to the inclination of the end 3 of the pipe section. The inclined end of the pipe section is formed with lugs 10 to which the outwardly opening valve 8 is pivoted in any suitable manner. The valve 8 is in the form of a disk and is flat upon its inner face so as to lie flat against the face of the plug 9.

In Fig. 1 the plug 9 is shown as being formed with a central passage 11. This passage 11 is in the form of a double cone, the passage contracting or tapering uniformly from the inner end face 12 of the plug to a point 13 and then expanding uniformly to the face of the plug. It will be seen that the most contracted part 13 of the passage 11 is very much smaller than the face of the valve and that the opening 14 of the passage is somewhat smaller than the valve, although larger than the most contracted portion 13 of the passage.

I have proved by numerous experiments that steam or like fluid passing through a construction of the character described will not act to open the valve, but instead will act to hold it closed. The exact reason for this is not known to me but it is a fact. Liquid, however, collected in the passage 11 and passing out through the orifice 14 will act to force the valve open, thus permitting the escape of liquid. I have found in practice that though the outlet end of the valve be inserted in a pipe having ten inches of vacuum, yet the valve will be held tightly to its seat, except where water is forced out.

Disposed within the pipe section 2 forming the body of my valve are a plurality of cones. I have shown two of these cones designated respectively 15 and 16. The small end of the cone 16 is inserted into the large end of the cone 15 and the small end of the cone 15 is inserted into the large end 12 of the conical passage 11. These cones are so arranged however, that a space is left between the outer face of one cone and the inner face of the next adjacent cone so that a space surrounds the small end of the cone 16 and the small end of the cone 15. The large ends of the cones 15 and 16 fit the inside of the pipe section 2 and they may be here formed so as to have a screw threaded engagement with the interior of the pipe section and preferably are provided with packing rings 17 for the purpose of holding the cones rigidly in place and with the axes of the cones in alinement with the axis of the pipe 2 and in alinement with the contracted end 13 of the passage 11. Each cone 15 and 16 is notched or grooved as at 18 so as to establish communication between the spaces surrounding the cones and inclosed by the pipe section 2. It will thus be seen that communication is established between the pipe 6 and the spaces surrounding the several cones 29, 32 and 33, or the several cones 15 and 16. Located behind the rearmost cone 16 is a screen 19 of wire gauze or like material preventing the projection of solid particles into the cones.

The operation of this form of my invention is as follows: Under normal circumstances steam will fill the pipe 2 and will be projected through the several cones and against the face of the valve 8. Steam, however, will not open the valve but will cause it to be held to its seat. When, however, the steam condenses, water will fill the pipe 2 and the pipe 6 connected thereto and this water will pass out through the cones 16, 15 and 11 and the force of the water will act to open the valve permitting the escape of the water. The cones of the body of this valve work on the same principle as the cones of an injector, that is, the water in passing through the cones attains relatively high velocity. This produces a vacuum in the space surrounding the cones and as a consequence of these spaces being connected to the pipe, a vacuum will be produced in the pipe to which this valve is attached and thus helps to relieve the pipe of the condensed water in a relatively short space of time. Where the valve is to be used with steam under high pressure, I seat within the orifice 14, and preferably flush with the inclined face of the plug 9, the disk 20, which disk is provided with a plurality of relatively small openings 21. As shown there are three of these openings. I find in practice that this permits my valve to be used under a high pressure of steam, the disk 20 acting as a reducer, reducing the size of the orifice 14, so that the high pressure under which the steam works will not act to force open the valve.

While I have shown the check-valve 8 as being a swing check valve pivoted to the ears 10 I do not wish to limit myself to this as it is obvious that any other form of check-valve might be used, thus for instance in Fig. 4 I show the extremity of the pipe-section 2 as being provided with an arm 22 which is mounted in any suitable manner upon the pipe section or within the casing 6, this arm extending down in front of the end of the pipe section 2 and being formed with a small perforation 23 in which plays a valve stem 24 carrying upon its end the check-valve 25 in the form of a relatively large plate or disk. This form of valve operates in precisely the same manner as the swing check valve.

In Fig. 5 I show another form of the invention which, however, operates in precisely the same manner as the form shown in Fig. 1. In this form the body 25 of the valve is inserted in a T 26 closed in one end by a plug 27. The valve body 25 has an inclined end as previously described, this end being closed in any suitable manner as by the plate 28. Instead of having the first cone formed by providing a double conical passage in the end of the valve body, I provide a separate cone designated 29 in Fig. 6. This cone is contracted from its large end to a point 30 and is then expanded so as to project slightly through a central orifice in the plate 28. The large end of the cone is provided with screw-threads 31 whereby the cone may be screwed into place, the interior face of the pipe section 2 being also screw-threaded. The cones 32 and 33 are constructed precisely like the cones 15 and 16, previously described and have a like relation to the first cone 29. The inlet end of the valve body is also provided with a screen 34 which is precisely the same as the screen 19 for a like purpose. The object of this form of the invention is precisely the same as that previously described, and the ejecting orifice 29 may be closed by a plate 20, or not, as circumstances require. Steam passing into the pipe from the body of the valve passing through the cones will be ejected against the face of the valve and will act to draw the valve to its seat. Water, however, passing through the cones will be given a high velocity, and the valve will act to draw the water from the pipes connected to the pipe-section 25 forming the body of the valve. I have used this valve in practice and find it entirely effective and that it operates in precisely the manner stated.

Having thus described the invention what is claimed as new is:—

1. In a valve of the character described, a hollow body portion provided with an outwardly expanded orifice at one end, a valve seating against the body to close the orifice but movable away therefrom, and a series of conically converging nozzles disposed in the body, the small ends of the cones being directed toward the orifice.

2. In a valve of the character described, a hollow body provided with an outwardly flared orifice at one end, a valve seating against the body to close the orifice but movable away therefrom, and a series of conically converging nozzles disposed in the body and having their small ends directed toward the orifice, the contracted end of one cone projecting into the large end of the next adjacent cone but being spaced therefrom.

3. In a valve of the character described, a hollow body provided with an orifice at one end, a valve seating against the body to close the orifice but movable away therefrom, and a series of conically converging nozzles disposed in the body and having their small ends directed toward the orifice, the large ends of the cones filling the body and dividing it into a series of compartments communicating with each other by peripheral passages.

4. In a valve of the character described, a hollow body provided with an orifice at one end, a valve seating against the body to close the orifice but movable away therefrom, and a series of conically converging nozzles disposed in the body and having their small ends directed toward the orifice, the large ends of the cones extending entirely across the body and dividing it into a series of compartments, the cones being provided with peripheral passages for establishing communication between the compartments.

5. In a valve of the character described, a hollow body provided with an orifice at one end, a valve seating against the body to close the orifice but movable away therefrom, and a conically converging nozzle disposed within the body and having the front end directed toward the orifice, the periphery of each nozzle having screw-threaded engagement with the interior of the body.

6. In a valve of the character described, a hollow body having a discharge passage uniformly contracted from the inlet end, and then expanded to the discharge orifice of the passage, and a valve disk closing the discharge end of the passage but movable away therefrom.

7. In a valve of the character described, a hollow body having a discharge passage uniformly contracted from the inlet end and then expanded to the outlet orifice of the passage, a series of conically converging nozzles disposed within the body and having their front ends extending toward the said passage, the front ends of the nozzles extending into the large ends of the next adjacent nozzles, and a valve disk closing the discharge end of the passage but movable away therefrom.

8. In a valve of the character described, a hollow body having a discharge passage uniformly contracted from the inlet end and then expanded, a reducing disk located in the orifice of the passage and having a plurality of relatively small perforations, and a valve closing the discharge end of the passage but movable away therefrom.

9. In a valve of the character described, a hollow tubular body exteriorly screw threaded at opposite ends, one end of the body being formed with a discharge passage which is gradually contracted to a relatively small diameter and is then outwardly flared to the end face of the body, a plurality of conically converging nozzles carried within the tubular body, the small end of one nozzle being inserted in the large end of the next adjacent nozzle, said nozzles being directed toward and in alinement with the discharge passage, a screen located at the inlet end of the tubular body, and a valve mounted upon the face of the tubular body at the outlet end thereof and movable toward or away from the discharge orifice.

In testimony whereof, I affix my signature in presence of two witnesses.

SAMUEL V. SHAROOD. [L. S.]

Witnesses:
  JAMES B. HOLT,
  T. ALBERT TABER.